(12) United States Patent
Bakhoum (10) Patent No.: US 9,044,026 B2
(45) Date of Patent: Jun. 2, 2015

(54) APPARATUS AND METHOD FOR SIMULTANEOUS IMPRINTING AND PIERCING OF DOUGH

(71) Applicant: Michel T Bakhoum, Mundelein, IL (US)

(72) Inventor: Michel T Bakhoum, Mundelein, IL (US)

(*) Notice: Subject to any disclaimer, the term of this patent is extended or adjusted under 35 U.S.C. 154(b) by 0 days.

(21) Appl. No.: 14/046,957

(22) Filed: Oct. 5, 2013

(65) Prior Publication Data

US 2014/0370150 A1 Dec. 18, 2014

Related U.S. Application Data

(63) Continuation-in-part of application No. 13/917,442, filed on Jun. 13, 2013.

(51) Int. Cl.
*A21C 11/02* (2006.01)
*A21C 11/08* (2006.01)

(52) U.S. Cl.
CPC ...................... *A21C 11/08* (2013.01)

(58) Field of Classification Search
CPC ........ A21C 11/02; A21C 11/06; A21C 11/08; A21C 11/10; A21C 11/106; A21C 11/004; A21C 3/10; A21C 5/00; A21C 5/08; A21C 7/00; A21C 7/06; A21C 9/066; A21C 14/00; A21C 15/04; A21C 15/02; A21C 15/025
USPC ......... 425/292, 296, 298, 299, 308, 310, 318, 425/193, 195, 235, 238, 340, 385, 394, 395, 425/396, 398, 401, 404, 406, 407, 408, 412, 425/420, 812; 249/63, 78, 102, 104, 140, 249/141, 217; 426/87, 283, 383, 391, 496, 426/503, 512, 518
See application file for complete search history.

(56) References Cited

U.S. PATENT DOCUMENTS

| | | | |
|---|---|---|---|
| 177,319 A | 5/1876 | Blaul | |
| 2,008,725 A | 7/1935 | Parker | |
| 2,059,353 A * | 11/1936 | Houck | 425/195 |
| 2,134,026 A * | 10/1938 | Brooks | 426/275 |
| 2,744,476 A * | 5/1956 | Suzuki | 425/293 |
| 2,780,181 A * | 2/1957 | Roman et al. | 425/299 |
| 2,975,741 A * | 3/1961 | Ruffino | 72/338 |
| 4,276,800 A | 7/1981 | Koppa et al. | |
| 4,384,838 A * | 5/1983 | Laughlin | 425/299 |
| 4,424,601 A | 1/1984 | Weber | |
| 5,052,258 A * | 10/1991 | Hunter | 83/589 |
| 5,149,594 A * | 9/1992 | Lewandowski et al. | 426/503 |
| 5,162,119 A | 11/1992 | Pappas et al. | |
| 5,259,750 A * | 11/1993 | Lewandowski et al. | 425/298 |
| 5,388,489 A | 2/1995 | Dayley | |
| 5,458,900 A * | 10/1995 | Rubio et al. | 426/512 |
| 5,540,140 A * | 7/1996 | Rubio et al. | 99/353 |
| 5,871,783 A * | 2/1999 | Capodieci | 425/174.2 |

(Continued)

*Primary Examiner* — Seyed Masoud Malekzadeh
(74) *Attorney, Agent, or Firm* — Takiguchi & Vogt, LLP (57) ABSTRACT

An apparatus is disclosed for concurrently imprinting and piercing of dough consisting of flour, water and yeast to produce loaves imprinted with an image that represents Coptic religious symbols including Coptic letters, crosses, circles and squares. The imprinting is accomplished using embossed patterns engraved onto an upper plate that is pressed onto a lower plate containing the dough placed inside depressions disposed below the surface of the lower plate. The imprinting is implemented after the step of proofing the dough in a process for preparing the loaves that includes the steps of flattening, proofing, imprinting and baking.

13 Claims, 8 Drawing Sheets

(56) References Cited

U.S. PATENT DOCUMENTS

| | | | |
|---|---|---|---|
| 5,996,476 A * | 12/1999 | Schultz | 99/349 |
| 6,231,330 B1 * | 5/2001 | Capodieci | 425/174.2 |
| 6,431,849 B1 * | 8/2002 | Capodieci | 425/174.2 |
| 6,530,767 B1 * | 3/2003 | Capodieci | 425/174.2 |
| 6,607,765 B2 * | 8/2003 | Capodieci | 426/238 |
| 6,990,892 B2 * | 1/2006 | Errera | 99/388 |
| 7,316,555 B2 * | 1/2008 | Hubener | 425/300 |
| 7,331,776 B2 * | 2/2008 | Errera | 425/298 |
| 7,677,879 B1 * | 3/2010 | Craig et al. | 425/290 |
| 7,845,928 B2 | 12/2010 | Finkowski et al. | |
| 8,109,203 B1 * | 2/2012 | Rivera | 99/349 |
| 8,287,265 B2 * | 10/2012 | Errera | 425/299 |
| 8,695,220 B2 * | 4/2014 | Rhoads et al. | 30/114 |
| 2003/0003207 A1 * | 1/2003 | Capodieci | 426/421 |
| 2004/0040443 A1 * | 3/2004 | Errera | 99/388 |
| 2004/0040446 A1 * | 3/2004 | Errera | 99/388 |
| 2004/0129148 A1 * | 7/2004 | Romano | 99/388 |
| 2005/0076516 A1 * | 4/2005 | Groll et al. | 30/315 |
| 2005/0132579 A1 * | 6/2005 | Sartori | 30/299 |
| 2006/0123997 A1 * | 6/2006 | Hubener | 99/426 |
| 2006/0182859 A1 * | 8/2006 | Arend | 426/503 |
| 2006/0225579 A1 * | 10/2006 | Errera | 99/388 |
| 2006/0272162 A1 * | 12/2006 | Atwater et al. | 30/303 |
| 2006/0272461 A1 * | 12/2006 | Atwater et al. | 83/13 |
| 2006/0272466 A1 * | 12/2006 | Atwater et al. | 83/620 |
| 2007/0065528 A1 * | 3/2007 | Hernandez | 425/9 |
| 2007/0125210 A1 * | 6/2007 | Kaposi | 83/167 |
| 2008/0118605 A1 * | 5/2008 | Owen | 426/87 |
| 2008/0241326 A1 * | 10/2008 | Ekberg | 426/512 |
| 2010/0068321 A1 * | 3/2010 | Errera | 425/96 |
| 2010/0159095 A1 | 6/2010 | Suski et al. | |
| 2011/0283548 A1 * | 11/2011 | White | 30/301 |
| 2012/0042519 A1 * | 2/2012 | Goode et al. | 30/124 |
| 2012/0251690 A1 | 10/2012 | Flores | |

* cited by examiner

APPARATUS AND METHOD FOR SIMULTANEOUS IMPRINTING AND PIERCING OF DOUGH

RELATED APPLICATIONS

This application is a continuation in part of non-provisional application Ser. No. 13/917,442 filed on Jun. 13, 2013.

FIELD OF THE INVENTION

The present invention generally relates to an apparatus and a method for embossing and imprinting dough. More specifically, the present invention relates to an apparatus and a method of producing dough sections of predetermined size and shape, gelatinizing the surface of the dough, proofing the dough, embossing the sections with Coptic religious insignia and baking the dough sections to form loaves for ceremonial purposes.

BACKGROUND OF THE INVENTION

A Coptic Orthodox Christian congregation has a meal together after the holy mass as a sign of love and communion. In in the early days a complete meal was offered after the mass. At the present time, the Korban, a small round loaf of bread has been substituted for the meal. The Korban is stamped with the "Trisagin" (the triple invocation of God as holy) and with crosses and has the same wheat flour, water and yeast only. The bread is leavened and is baked unsalted. The central part of the Korban is called "Despatikon" meaning "Lordly" and around the Despatikon twelve crosses referring to the twelve disciples. The Despatikon also is pierced with five holes referring to the spear and nails which Christ suffered. The word "Agios" is written in three times on the periphery of the Despatikon which represents the "Holy Trinity".

Currently, most of the individual churches around the world make the Korban on the premises manually and with primitive means. The first part of the process of the present invention, which is preparing the dough in the form of slab or individual round ball is easy to address because there is commercial equipment available in the market as such as sheeters, rounders and dividers that accomplish this part of the process. However, the second part of the process of the present invention which includes the cutting, stamping and piercing the dough presents a major challenge as no commercial equipment is available to accomplish these steps. The second part of the process is the most time consuming and has the largest impact on the quality and uniformity of the finished Korban. This has led to the subject matter of this invention.

Prior art references that relate to imprinting dough with relatively complex patterns engraved on a surface disposed on stamping devices include: U.S. Pat. No. 177,319, U.S. Pat. No. 2,008,725, U.S. Pat. No. 4,424,601, U.S. Pat. No. 6,990,892 U.S. Pat. No. 4,276,800, U.S. Pat. No. 5,162,119, U.S. Pat. No. 5,388,489, U.S. Pat. No. 7,845,928, US2010/0159095 and US2012/0251690. Generally, the stamping devices contain engraved units surrounded by borders configured for stamping out dough pieces by applying vertical pressure onto these stamping devices.

Imprinting this pattern on dough and creating the finished Korban presents a number of challenges not addressed by the prior art. The pattern on the Korban loaf contains raised areas, such as the images of some of the crosses and the Coptic symbols and letters, alongside sunken areas; for example in some of the border outline areas and some of the cross images. The overall pattern must be configured in such a way that the dough flows smoothly between the raised and sunken areas on the emboss pattern so that not to disrupt the imprinted images on the Korban. Furthermore, the dough must be pierced through to produce the five holes representing the spear and nails that pierced Christ. Additionally, each loaf must go through the process of proofing and baking individually starting with uncured dough pieces that contain only flour water and yeast that tend to be unstable if left unbaked for long periods of time. In order to prevent the imprint on the dough from fading away, the dough must be sufficiently hard and stable when imprinted. This is accomplished by using heat while flattening the dough balls to flat and circular patty shaped dough. Throughout the process, air tends to build up inside the dough and a mechanism that allow for the air to escape in order to prevent air build-up from disrupting the dough from rising to the full loaf must be provided.

SUMMARY OF THE PRESENT INVENTION

In one aspect of the present invention, an apparatus configured for concurrently imprinting and piercing of dough to produce imprinted loaves, the dough consisting of flour, water and yeast, the apparatus comprises: an upper plate holder attached to a movable arm; a substantially flat first upper plate having a bottom side surface, the first upper plate being adapted for removably mounting onto the upper plate holder; a lower plate holder disposed in a fixed position; a substantially flat lower plate having a top side surface, the lower plate being adapted for removably mounting into the lower plate holder; a second substantially flat upper plate having a bottom side surface, the second flat upper plate being adapted for removably mounting into the upper plate holder, the second upper plate containing at least one emboss pattern engraved onto the bottom side surface of the second upper plate, the emboss pattern containing a plurality of shaped projections that protrude outwardly and are elevated above the bottom side surface of the second upper plate, the emboss pattern also containing recessed areas below the bottom side surface, the embossed pattern also containing a plurality of outwardly projecting pins contained within the emboss pattern, the pins being affixed on the bottom side surface of the upper plate; at least one round-shaped depression disposed below the top side surface of the lower plate; and means for applying pressure onto the upper plate holder such that an upper plate mounted onto the upper plate holder contacts the lower plate in a substantially parallel position relative to the lower plate and transfers the pressure to the upper plate and subsequently to the lower plate, and such that each emboss pattern disposed on the second upper plate bottom surface substantially lines up with a corresponding depression disposed below the lower plate top side surface.

In another aspect of the present invention, a method for producing loaves each imprinted with a pattern containing a plurality of raised areas and a plurality of recessed areas the method comprises: providing an apparatus configured for simultaneously imprinting and piercing of dough to produce imprinted loaves, the dough consisting of flour, water and yeast, mounting the first upper plate onto the upper plate holder and heating the first upper plate to a predetermined temperature; mounting the lower plate onto the lower plate holder and heating the lower plate to a predetermined temperature; placing a dough piece of a predetermined weight into each depression; applying pressure onto the first upper plate in a manner as to bring the first upper plate in contact with the lower plate and in a manner as to flatten each dough piece such that it fills its corresponding depression to produce flat dough pieces inside the depressions; gelatinizing the surface of each dough piece to make the dough malleable; proofing the flat pieces at a predetermined temperature and humidity levels for a period of between about 20 minutes and 40 minutes to produced proofed dough pieces; removing the first upper plate from the upper plate holder and mounting the second upper plate onto the upper plate holder; applying pressure onto the second upper plate in a manner as to bring the second upper plate in contact with the lower plate in a manner as to press the emboss patterns onto the proofed dough pieces to produce imprinted loaves; and placing the imprinted loaves into a convection oven for between about 10 minutes and 20 minutes at a temperature of between about 350 degrees F. and about 400 degrees F.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention.

The present invention relates to apparatus configured for concurrently imprinting and piercing of dough consisting of only flour, water and yeast to produce imprinted loaves. To accomplish this, the apparatus contains a plurality of emboss patterns engraved on an upper plate that is pressed onto a lower plate onto which pieces of dough are placed such that each emboss pattern presses onto a corresponding dough piece. Pressing the upper plate onto the lower plate may be accomplished by hand or by any mechanized device currently known in the art.

The general steps of producing a loaf form dough having the composition of the present invention involves the steps of:

1. Preparing pieces of dough having the appropriate dry weights for the finished loaf at a consistency of between about 45% and about 55%.

2. Molding the dough into the approximate shape desired for the finished loaf. This may include cutting, sheeting, rounding and flattening the dough.

3. Heating the surface of the dough to a temperature ranging from about 90 degrees F. to about 180 degrees F. This step gelatinizes the surface of the dough, makes it more malleable and initiates the rise of the dough. Only a short exposure of less than a minute to the temperature range between about 90 degrees F. to about 180 degrees F. is necessary to accomplish this step.

4. Subsequently, the dough is proofed or fermented at a temperature of between about 85 degrees F and 100 degrees F. for a time ranging from about 20 minutes to about 40 minutes at humidity levels of between about 75% and about 100%. Proofing the dough continues the rise of the dough to the desired volume and shape.

5. The proofed dough may be frozen for further baking at a later date as necessary.

6. To finish the process, the proofed dough is baked in the oven for between about 20 minutes and about 40 minutes at a temperature of between about 350 degrees F. and 400 degrees F.

The embossing of the dough in the present invention is performed following the proofing of the dough.

Figure 1:
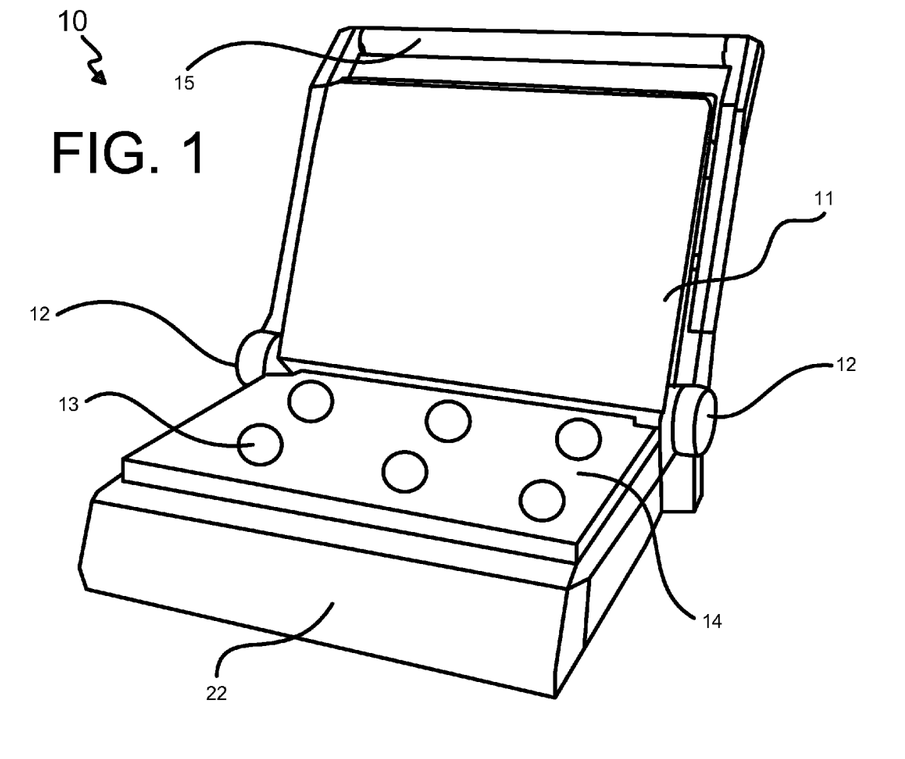
FIG. 1 shows a perspective view of an apparatus configured for concurrently imprinting and piercing of dough to produce imprinted loaves with the image of the Korban in accordance with an embodiment of the present invention.
Figure 2:
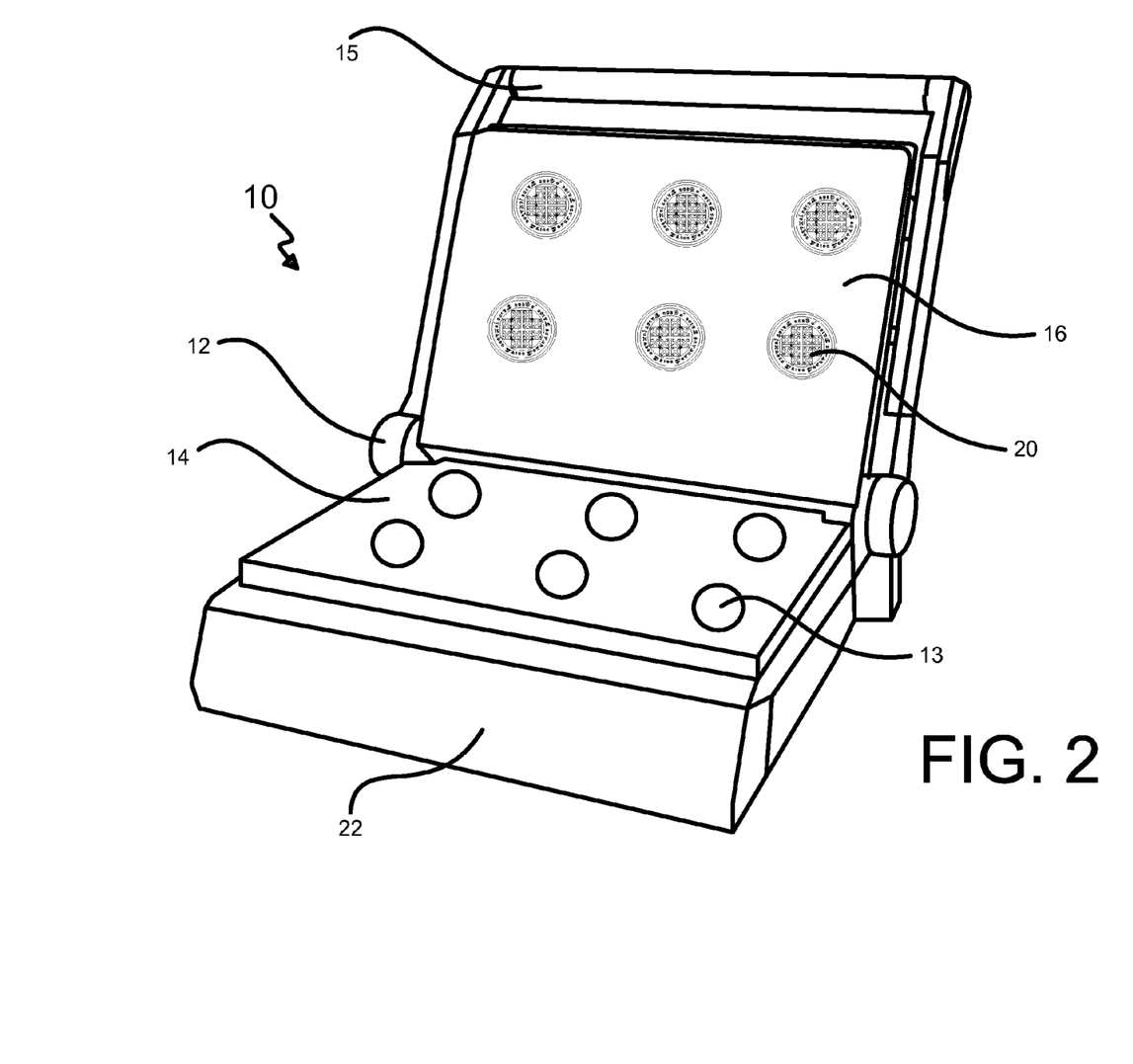
FIG. 2 is another perspective view of an apparatus configured for concurrently imprinting and piercing of dough to produce imprinted loaves with the image of the Korban in accordance with an embodiment of the present invention.
Figure 3:
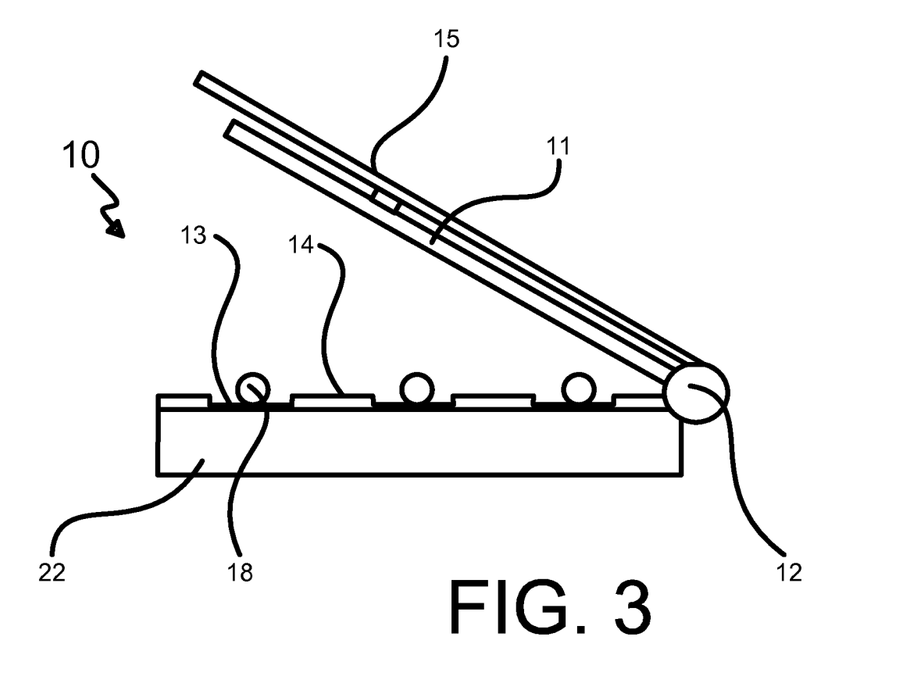
FIG. 3 illustrates a step in the process of making embossed loaves in a cross sectional side view of an apparatus configured for concurrently imprinting and piercing of dough to produce imprinted loaves with the Korban image in accordance with an embodiment of the present invention.

The apparatus and process of producing loaves from dough is illustrated in FIGS. 1-10. In the preferred embodiment of the present invention, the lower plate is flat and contains a plurality of circular shaped depressions disposed below the top surface of the lower plate. Each depression is about 0.5 to 1 inches deep and between about 2 to about 4 in diameter. In the first step of the process of producing loaves from the dough, an uncured dough piece is placed in each depression as shown in FIG. 3. A flat plate 11 is placed in the upper plate position of the apparatus 10. The configuration of the press may take various forms. In one embodiment, the upper plate is removably mounted onto a holder which is in turn attached to a movable arm. Likewise, the lower plate may also be removably mounted onto a holder. Pressing the upper plate onto the lower plate may be done by hand or by mechanical means. When the upper flat plate is pressed against the lower plate, the dough piece in each depression, preweighed to the appropriate weight, is forced into its corresponding depression to completely fill it.

The upper and lower plates are equipped with means to heat their surfaces to a temperature range of between about 90 degrees F. and 180 degrees F. When the upper heated plate comes in contact with the dough pieces, the process of flattening and gelatenizing the dough surface begins. Next, the lower plate containing the dough pieces is removed and placed in a temperature and humidity conditioned area where the process of proofing is carried out. In the next step, the upper flat plate is replaced with a second plate containing a plurality of emboss patterns engraved onto the bottom surface of the second plate which is pressed onto the lower plate. In one embodiment, three rows each having two emboss patterns are engraved on the second upper plate bottom surface; however, other arrangements of the emboss patterns also fall within the scope of the present invention.

The emboss patterns are configured to produce a plurality of images on the dough pieces that represent Coptic religious symbols including Coptic letters, crosses, circles and squares. These images are created by a combination of recessed areas and protrusions on the emboss pattern that are imprinted and transferred onto the Korban loaf surface.

Surrounding each emboss patterns are circular borders that protrude out of the surface of the upper emboss plate. The borders help prevent the dough from flowing outside the loaf as a result of dough dislocation due to the embossing and ensures that the top surface of the dough makes full contact with the emboss pattern.

FIGS. 1 and 2 show perspective views of the apparatus 10 for imprinting the emboss pattern onto the Korban loaves. Lower plate 14 is disposed onto and held by base 22. An upper frame contains a handle 15 and either removable flat plate 11 or emboss plate 16. The frame is equipped with pivots 12 that allow the frame holding either the first or the second upper plate to pivot toward the lower plate 14.

Figure 8:
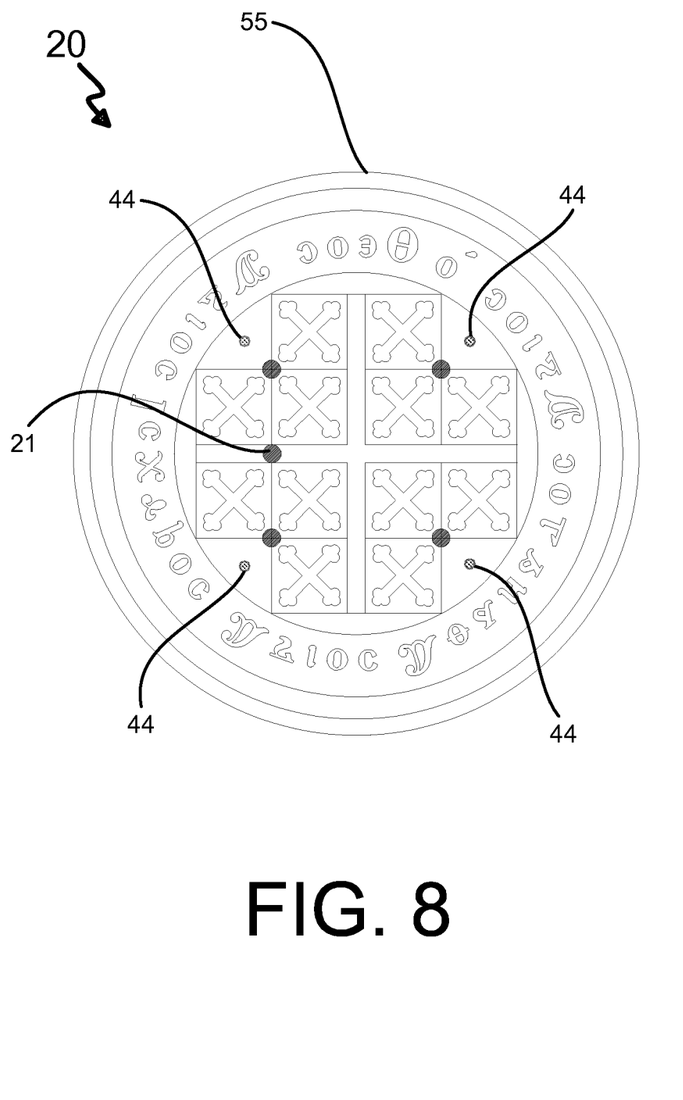
FIG. 8 is a front view of an individual emboss pattern engraved onto the surface of the embossed upper plate according to an embodiment of the present invention.

FIG. 8 shows an individual emboss pattern 20 for use in forming a Korban loaf to be used at the Coptic communion meal. Symbols and characters are engraved to form the words Holy or "Agios" three times adjacent the periphery of the round Korban loaf. It will be readily appreciated that the raised characters appearing on the Korban loaf constitute the mirror image of the emboss pattern 20. A large cross formed in the center of the plate represents Jesus Christ. Also, the central part of the emboss pattern are twelve crosses. These are in reference to the twelve disciples. Also in the center of the plate, five pins labeled 21 extend from the surface of the plate to pierce the loaf and are in reference to the five wounds suffered by Jesus Christ on the cross. The Korban loaf is circular in shape of the sun and refers to Jesus Christ. Thus, each part of the Korban loaf is formed to have religious connotation. The individual emboss pattern 20 also contains four holes 44 included in the emboss pattern. The holes 44 are used to vent out that may build up in the process of imprinting the dough. It is noted that the Coptic letters and symbols are arranged in a circle at the perimeter of the emboss pattern while the cross designs are situated in the center of the emboss pattern. The letters and symbols are generally sunken below the surface of the emboss pattern and produce the desired imprints on the Korban loaf in the form of raised symbols and letters. The cross designs may be made of a more complex combination of protrusions and recessed areas that produce the opposite image forms on the Korban.

Figure 9:
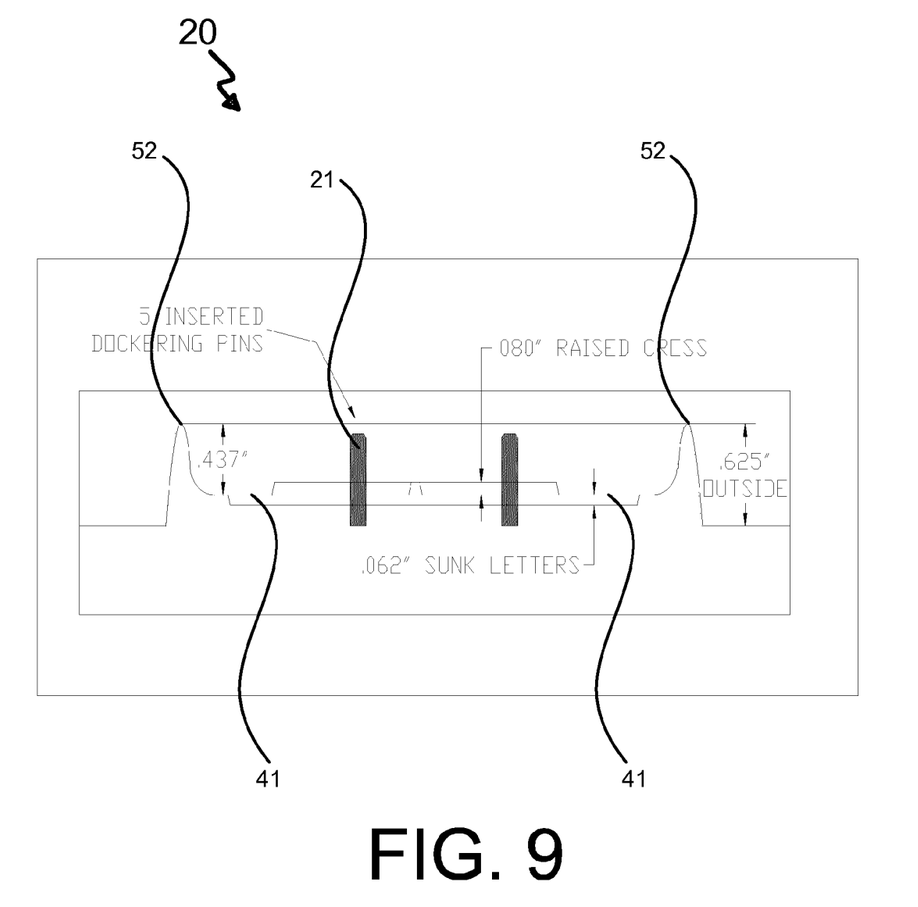
FIG. 9 shows a cutaway view of raised emboss elements and recessed areas on the embossed pattern surface according to an embodiment of the present invention.

The sectioned side view of FIG. 9 shows the emboss pattern 20 inside borders 52 having a combination of raised areas and sunken areas in relation to the emboss pattern surface 41 highlighting the pins 21 and dimensions of the emboss pattern components in one embodiment of the present invention.

The borders around each individual emboss pattern are raised relative to the engraved surface by a height ranging from about 0.4 inches to about 0.45 inches. The emboss pattern 20 includes five pins which extend through the surface of the respective plates and pierce five spaced holes in the dough. The pins also protrude from about 0.38 inches to about 0.43 inches above the engraved surface. The pins preferably are raised to a level below the borders as illustrated in FIG. 9.

Figure 10:
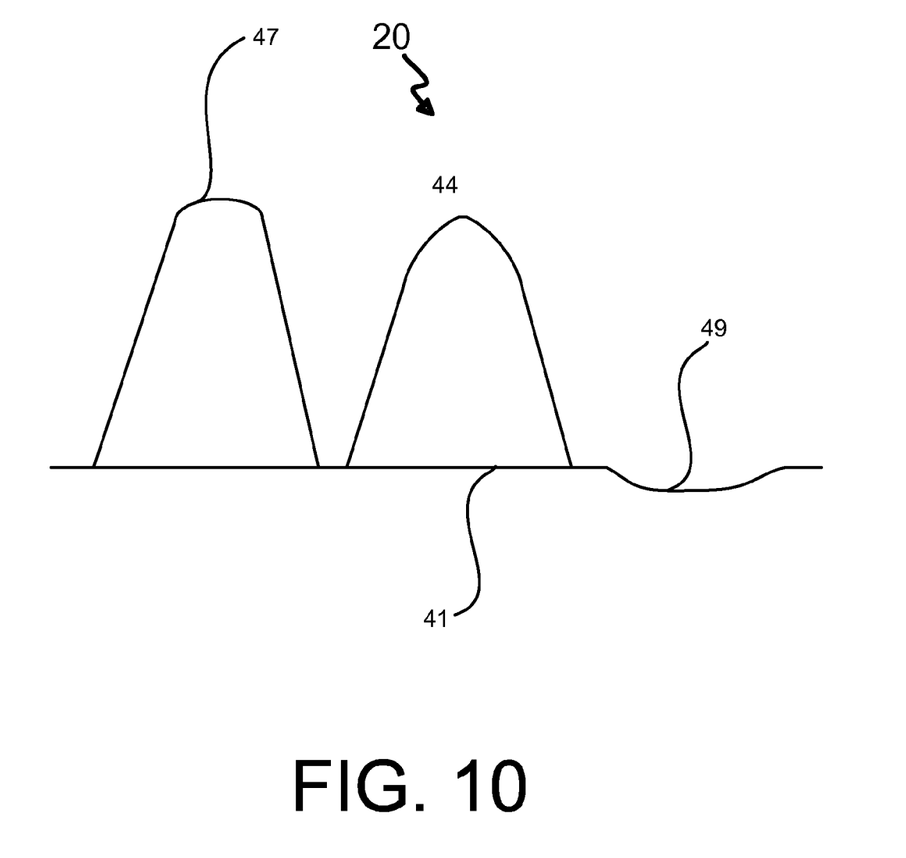
FIG. 10 is a depiction of shaped emboss-pattern components according to an embodiment of the present invention.

FIG. 10 shows raised emboss elements 47 and sunken areas 49 areas in relation to the surface 41 onto which the emboss pattern is engraved. The emboss pattern elements 47 are preferably shaped in a way that the dough flows smoothly around the elements to avoid the formation of ridges and rough areas on the Korban loaf. As can be seen, the sides of the elements are angled, also referred to in the art as "radiused" such that the top is narrower than the base and the ends are rounded. Likewise, the sunken areas do not contain any sharp angles.

Figure 4:
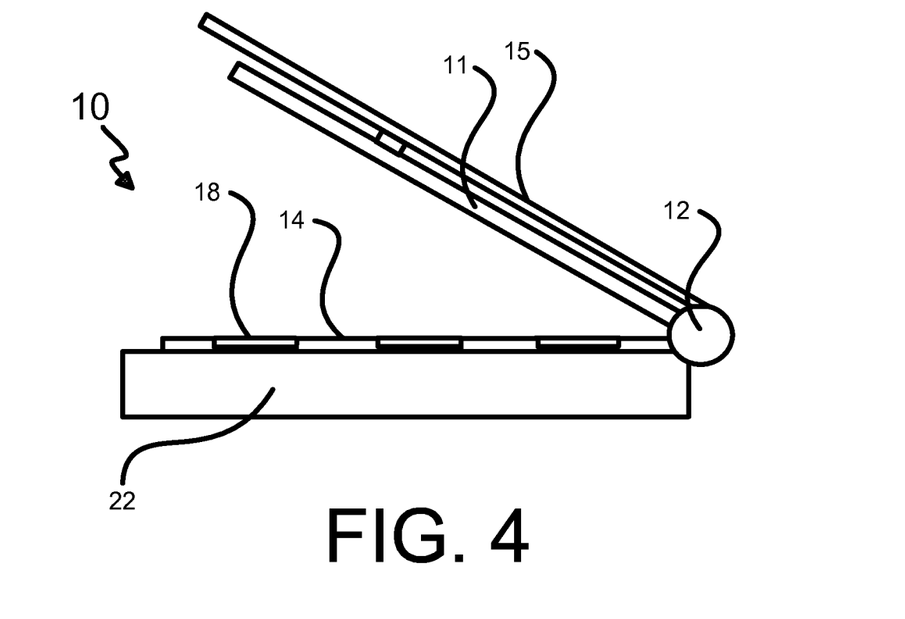
FIG. 4 portrays another step in the process of making embossed loaves in a cross sectional side view of an apparatus configured for concurrently imprinting and piercing of dough to produce imprinted loaves with the Korban image in accordance with an embodiment of the present invention.
Figure 5:
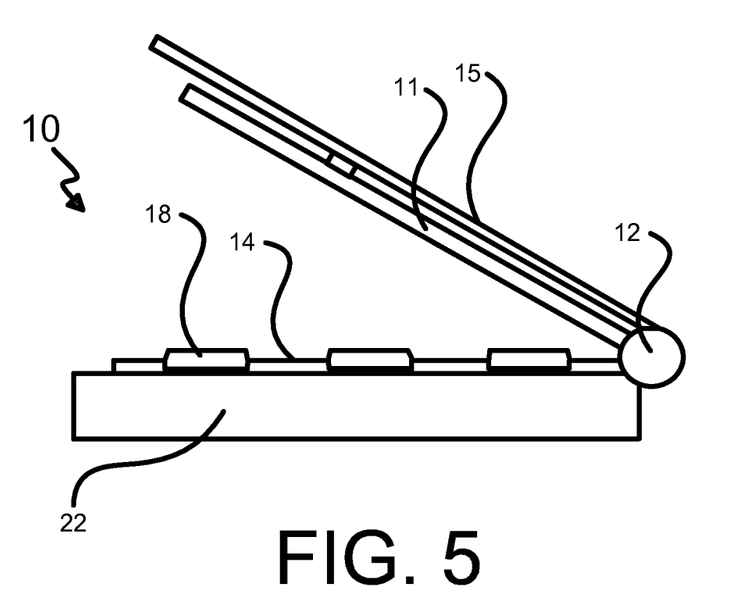
FIG. 5 depicts another step in the process of making embossed loaves in a cross sectional side view of an apparatus configured for concurrently imprinting and piercing of dough to produce imprinted loaves with the Korban image in accordance with another embodiment of the present invention.
Figure 6:
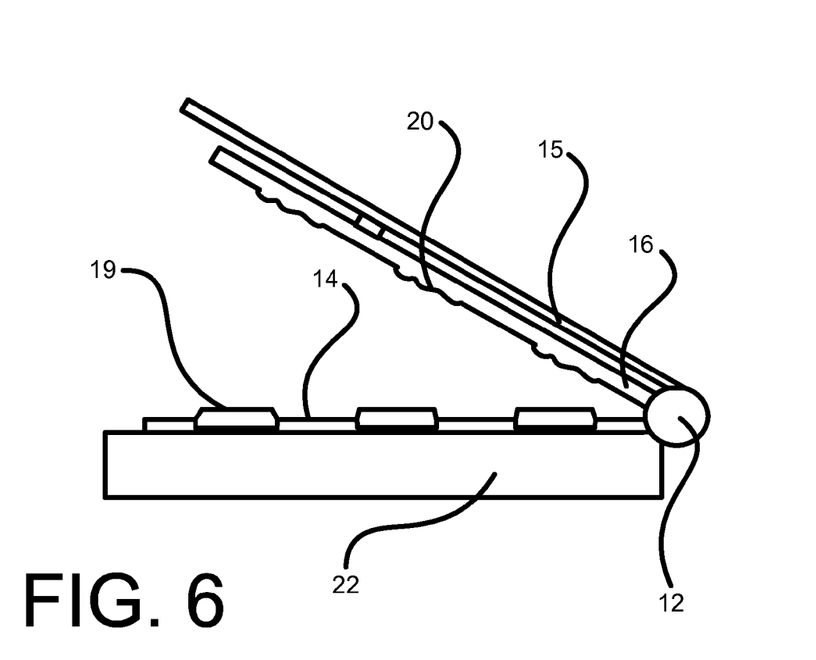
FIG. 6 shows another step in the process of making embossed loaves in a cross sectional side view of an apparatus configured for concurrently imprinting and piercing of dough to produce imprinted loaves with the Korban image in accordance with another embodiment of the present invention.
Figure 7:
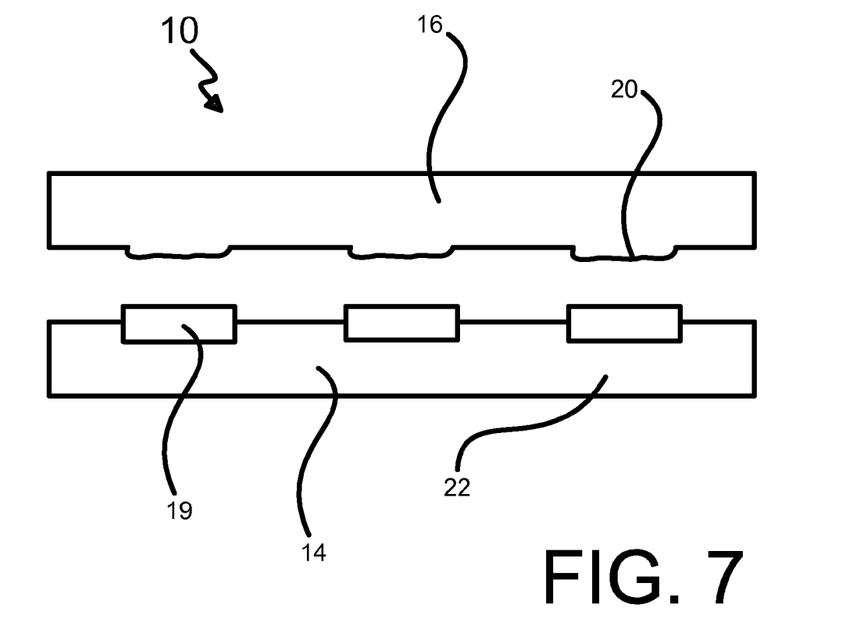
FIG. 7 portrays yet another step in the process of making embossed loaves in a cross sectional side view of an apparatus configured for concurrently imprinting and piercing of dough to produce imprinted loaves with the Korban image in accordance with another embodiment of the present invention.

FIGS. 3-7 show steps of the process for making embossed loaves. Ball shaped dough pieces 18 are placed inside the depressions 13 disposed on the lower plate 14 as shown in FIG. 3. The dough 18 fills the depressions after the first flat upper plate 11 is pressed onto the ball shaped dough 18 as shown in FIG. 4. The dough 18 rises after the surface gelatinizing step and proofing as shown in FIG. 5. The flat upper plate 11 is then replaced with the second plate, 16 that has the emboss pattern 20 engraved onto it as illustrated in FIG. 6. The emboss patterns 20 are lined up with the dough pieces 18 in the depressions 13 and the embossing is carried out in the manner shown in FIG. 7.

It should be understood, of course, that the foregoing relates to exemplary embodiments of the invention and that modifications may be made without departing from the spirit and scope of the invention.

I claim:

1. An apparatus configured for manually and concurrently imprinting and piercing of dough to produce imprinted loaves, said dough consisting of flour, water and yeast, said apparatus comprising:

an upper plate holder attached to a movable arm;

a substantially flat first upper plate having a bottom side surface, said first upper plate being adapted for removably mounting onto the upper plate holder;

a lower plate holder disposed in a fixed position;

a substantially flat lower plate having a top side surface, said lower plate being adapted for removably mounting into the lower plate holder;

a second substantially flat upper plate having a bottom side surface, said second flat upper plate being adapted for removably mounting into the upper plate holder, said second flat upper plate containing a plurality of embossing patterns engraved onto the bottom side surface of the second flat upper plate, each of said embossing patterns having a circular border that protrudes, relative to each engraved surface of each of the respective embossing patterns by a height ranging from about 0.4 inches to about 0.45 inches beyond said bottom side surface of said second flat upper plate, each of said embossing patterns contains a plurality of areas that are recessed from a surface of each said embossing pattern, said recessed areas being arranged in a circle on a periphery of each embossing pattern, said recessed areas forming symbols representing Coptic script encircling a plurality of cross patterns, said recessed areas being configured to form corresponding raised areas on a respective loaf in a course of imprinting the loaves, wherein each circular border is configured to prevent the dough from flowing outside the respective loaf as a result of dough dislocation due to embossing of the dough and to ensure a top surface of a dough piece makes a full contact with the respective embossing pattern;

a plurality of outwardly projecting pins contained within said embossing patterns, said pins being affixed on said embossing pattern surface and protrude from about 0.38 inches to about 0.43 inches above said each of the engraved surfaces;

a plurality of round-shaped depressions disposed below the top side surface of the lower plate, wherein each of the depressions are about 0.5 to 1 inches deep and between about 2 to about 4 inches diameter; and a handle attached to said movable arm, said handle adapted to allow pressure to be manually applied to said upper plate holder such that the second upper plate mounted onto the upper plate holder contacts the lower plate in a substantially parallel position relative to the lower plate and transfers a pressure to said second upper plate and subsequently to the lower plate, and such that each of said embossing patterns disposed on the second upper plate bottom surface substantially lines up with a corresponding respective round-shaped depression disposed on the lower plate top side surface.

2. The apparatus of claim 1, wherein pressure applied by the first upper plate onto the lower plate is configured to flatten the dough piece placed inside each of the respective round-shaped depression disposed on the lower plate surface such that said dough piece spreads to fill said each respective round-shaped depression.

3. The apparatus of claim 2, wherein the pressure applied onto said lower plate by the second upper plate is configured to cause each embossing pattern to engage a piece of flattened loaf made from the dough placed inside the corresponding respective round-shaped depression in a manner such that each of the embossing patterns imprints the loaf with the embossing pattern and the pins contained within the embossing pattern pierce the loaf.

4. The apparatus of claim 3 further comprising a heater to heat the first upper plate bottom surface to a temperature ranging from about 90 degrees F. to about 180 degrees F.; and said heater adapted to heat the lower plate upper surface to a temperature ranging from about 90 degrees F. to about 180 degrees F.

5. The apparatus of claim 4 wherein said second upper plate is disposed horizontally and is pressed vertically onto the lower plate that is also disposed horizontally.

6. The apparatus of claim 1 wherein each embossing pattern contains a plurality of areas that are configured to imprint a plurality of cross images onto each respective loaf.

7. The apparatus of claim 6 wherein said embossing patterns are arranged on the second upper plate surface in at least one row and each row contains at least two embossing patterns.

8. The apparatus of claim 6 wherein said embossing patterns are arranged on the second upper plate surface in at least three rows wherein each row contains at least two embossing patterns.

9. The apparatus of claim 6, wherein each of said embossing patterns comprises at least one opening permeating through the second upper plate surface configured for creating a vent in an imprinted dough for allowing air pressure build-up to escape.

10. The apparatus of claim 6 wherein each of said embossing patterns is coated with a non-stick material to prevent dough picking by the emboss pattern.

11. The apparatus of claim 6 wherein each of said embossing patterns are identical.

12. The apparatus of claim 1, wherein each of said embossing patterns comprises the outwardly extending border around said of said embossing patterns, said border constituting lips protruding above the surface, said border restraining the dough from spreading outside the borders in the course of embossing the dough piece.

13. An apparatus configured for manually and concurrently imprinting and piercing of dough to produce imprinted loaves, said dough consisting of flour, water and yeast, said apparatus comprising:

an upper plate holder attached to a movable arm;

a substantially flat first upper plate having a bottom side surface, said first upper plate being adapted for removably mounting onto the upper plate holder;

a lower plate holder disposed in a fixed position;

a substantially flat lower plate having a top side surface, said lower plate being adapted for removably mounting into the lower plate holder;

a second substantially flat upper plate having a bottom side surface, said second flat upper plate being adapted for removably mounting into the upper plate holder;

said second upper plate containing a plurality of embossing patterns engraved onto the bottom side surface of the second upper plate, each of said plurality of embossing patterns contains a plurality of areas that are recessed from a surface of each respective embossing pattern, said recessed areas being arranged in a circle on a periphery of each respective embossing pattern, said recessed areas forming symbols representing Coptic script encircling a plurality of cross patterns, said recessed areas being configured to form corresponding raised areas on the respective loaf in a course of imprinting the loaves, wherein each of said embossing patterns having a circular border that protrudes relative to each engraved surface of each of the respective embossing patterns by a predetermined height such that each circular border is configured to prevent the dough from flowing outside the respective loaf as a result of dough dislocation due to embossing of the dough and to ensure that a top surface of a dough piece makes a full contact with the respective embossing pattern;

a plurality of outwardly projecting pins contained within said embossing patterns, said projecting pins being affixed on said respective embossing pattern surface and protrude from about 0.38 inches to about 0.43 inches above said each engraved surface;

a plurality of round-shaped depressions disposed below the top side surface of the lower plate, wherein each of the depressions are about 0.5 to 1 inches deep and between about 2 to about 4 inches diameter; and a handle attached to said movable arm, said handle adapted to allow pressure to be manually applied to said upper plate holder such that the second upper plate mounted onto the upper plate holder contacts the lower plate in a substantially parallel position relative to the lower plate and transfers a pressure to said second upper plate and subsequently to the lower plate, and such that each of said embossing patterns disposed on the second upper plate bottom surface substantially lines up with a corresponding respective round-shaped depression disposed on the lower plate top side surface.

\* \* \* \* \*